(12) United States Patent
Aoki et al.

(10) Patent No.: US 7,652,836 B2
(45) Date of Patent: Jan. 26, 2010

(54) LENS MODULE, CAMERA MODULE, AND METHOD OF MANUFACTURING CAMERA MODULE

(75) Inventors: Susumu Aoki, Ibaraki (JP); Takashi Hasuda, Ibaraki (JP); Michiko Yamazaki, Ibaraki (JP); Ikuo Shinta, Ibaraki (JP); Nobuyuki Nagai, Ibaraki (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 34 days.

(21) Appl. No.: 12/142,055

(22) Filed: Jun. 19, 2008

(65) Prior Publication Data

US 2008/0316623 A1 Dec. 25, 2008

(30) Foreign Application Priority Data

Jun. 20, 2007 (JP) ............................. 2007-162340
Sep. 19, 2007 (JP) ............................. 2007-243097
Sep. 19, 2007 (JP) ............................. 2007-243103

(51) Int. Cl.
*G02B 7/02* (2006.01)
(52) U.S. Cl. ..................................... 359/824
(58) Field of Classification Search ................. 359/694, 359/696, 821–824; 348/345, 376; 396/79, 396/85; 353/101
See application file for complete search history.

(56) References Cited

U.S. PATENT DOCUMENTS

2006/0061891 A1* 3/2006 Ito et al. ..................... 359/824

FOREIGN PATENT DOCUMENTS

| JP | 2003-219284 A | 7/2003 |
|---|---|---|
| JP | 2004-304605 A | 10/2004 |
| JP | 2005-157290 A | 6/2005 |
| JP | 2005-195682 A | 7/2005 |

* cited by examiner

*Primary Examiner*—Joseph Martinez
(74) *Attorney, Agent, or Firm*—Birch, Stewart, Kolasch & Birch, LLP

(57) ABSTRACT

There are provided first and second lenses, by which light incident from outside is condensed and caused to outgo, a barrel, which holds the first and second lenses, a barrel holding part having a substantially cylindrical shape to hold therein the barrel, a movement device for movement of the barrel holding part in an optical axis direction of the first and second lenses, and a pedestal having a lens receiving portion, which receives therein the barrel holding part in a slidable state, the pedestal receiving therein the barrel holding part contacting in plural lines with an inner wall surface of the lens receiving portion of the pedestal.

14 Claims, 10 Drawing Sheets

LENS MODULE, CAMERA MODULE, AND METHOD OF MANUFACTURING CAMERA MODULE

BACKGROUND OF THE INVENTION

The present invention relates to a lens module, etc., mounted on a portable telephone or the like and having a mode switching function.

Among small-sized camera modules used for portable telephones with a photographing function, surveillance cameras, etc., there appear camera modules with a mode switching function, by which a standard photographing mode (infinity mode) and a close-up photographing mode are switched in a simple way.

As a conventional technology described in publications and related to an improvement in operability of assembly of camera modules with a photographing mode switching function, there exists a technology of, for example, a camera module, which holds a lens to comprise a lens holder, a holder for holding the lens holder movably in an optical axis direction, and a regulating member fixed to an outer peripheral portion of the lens holder by means of an adhesive, and in which the outer peripheral portion of the lens holder is tapered to be decreased in diameter toward a subject (see JP-A-2005-195682).

Also, as a conventional technology described in publications and related to camera modules with a photographing mode switching function, there exists a technology of, for example, a camera, which comprises a cylindrical-shaped lead frame body with an optical unit received and held inside, a body internally threaded onto the lead frame body, and an image pickup device mounted to a bottom portion of the body, and in which the lead frame body is rotated to move axially in the body to change a focal distance of the optical unit, a plurality of thread ridges or thread grooves are formed circumferentially discontinuously and axially offset on an outer periphery of the lead frame body, thread grooves or thread ridges for threading with the multiplicity of thread ridges or thread grooves are formed on an inner periphery of the body (see JP-A-2005-157290).

Then, a camera module, in which a lens unit is threaded onto a barrel holding part, is sometimes changed in a threaded state by vibrations or the like. In such case, light outgoing from a lens could not appropriately form an image in an imaging region. In order to avoid such situation, a lens unit is threaded onto a barrel holding part to regulate image-formation and then fixed thereto by means of an adhesive or the like. With camera modules having a mode switching function, a barrel holding part is received and held in a state of being held by a spring and a spring presser to be movable in an optical axis direction. Therefore, a threaded state is changed by vibrations at the time of mode switching as well as by ordinary vibrations and so fixation with an adhesive is especially important.

However, it has been made difficult to ensure a space, into which an adhesive is injected, since threaded portions are closed by a spring presser according to a demand for miniaturization of a camera module in recent years.

Also, with camera modules having a mode switching function, mode switching is generally realized by changing a position (distance between an image pickup device and a lens) of a lens relative to an image pickup device. In order to move a position of a lens in a camera module and to fix the lens in a position after the movement, it is a simplest and reliable way to slide the lens relative to a reference plane.

In the case where sliding parts are present, however, abrasion dust generated by sliding enters a light receiving region and the abrasion dust could come out considerably in a picture.

On the other hand, when sliding parts are reduced so as to restrict abrasion dust as generated, a lens could also become offset in optical axis.

SUMMARY OF THE INVENTION

It is an object of the invention to provide a small-sized camera module, or the like, enabling an adhesive to be easily injected onto a threaded portion between a lens unit and a barrel holding part.

Also, it is an object of the invention to provide a lens module, or the like, in which an optical axis offset at the time of mode switching is restricted to a tolerance and a favorable photographing quality is maintained, in camera modules with a mode switching function.

In order to solve the problem described above, a lens module according to the invention comprises a lens unit including a lens, by which light incident from outside is condensed and caused to outgo, and a barrel, which receives therein the lens, a barrel holding part, with which the lens unit engages threadedly, and to which the lens unit is fixed by an adhesive, a pedestal mount including a barrel receiving portion, which receives therein the barrel holding part in a state of being slidable in a circumferential direction and movable in an optical axis direction of the lens, and an image pickup device receiving portion, which receives therein an image pickup device, which receives light outgoing from the lens to convert the same into an electric signal to output the same, an elastic member, which pushes the barrel holding part in a manner to maintain the same in a state of being received in the barrel receiving portion of the pedestal mount, and an interposing member fitted onto the pedestal mount to interpose the elastic member between it and the barrel holding part, the interposing member being formed with a notch, through which an adhesive is injected onto threaded portions of the lens unit and the barrel holding part.

Here, according to a feature that the interposing member is formed with a notch toward an opening portion of those female threads of the barrel holding part, with which the lens unit engages threadedly, an adhesive can be injected onto threaded portions of the lens unit and the barrel holding part through the notch from the opening portion of the female threads.

Also, according to a feature that an opening portion of those female threads, with which the lens unit engages threadedly, is tapered, it becomes easy to inject an adhesive onto the threaded portions.

Further, according to a feature that the elastic member is arranged in contact with an outer edge of an upper end surface of the barrel holding part, and the notch is formed in a position on the interposing member, which position is away from a position, in which the interposing member interposes the elastic member, an adhesive being injected can be surely injected onto the threaded portions without contacting with the elastic member.

In order to solve the problem described above, a camera module according to the invention comprises a lens unit including a lens, by which light incident from outside is condensed and caused to outgo, and a barrel, which receives therein the lens, a barrel holding part, with which the lens unit engages threadedly, and to which the lens unit is fixed by an adhesive, an image pickup device, which receives light outgoing from the lens to convert the same into an electric signal to output the same, a pedestal mount including a barrel receiving portion, which receives therein the barrel holding part in a state of being slidable in a circumferential direction and movable in an optical axis direction of the lens, and an image pickup device receiving portion, which receives therein the image pickup device, an elastic member, which pushes the barrel holding part to maintain the same in a state of being received in the barrel receiving portion of the pedestal mount, and an interposing member fitted onto the pedestal mount to interpose the elastic member between it and the barrel holding part, the interposing member being formed with a notch, through which an adhesive is injected onto threaded portions of the lens unit and the barrel holding part.

In order to solve the problem described above, a method of manufacturing a camera module, according to the invention, comprises the steps of: threadedly engaging a lens unit including a lens, by which light incident from outside is condensed and caused to outgo, and a barrel, which receives therein the lens, with a barrel holding part, receiving the barrel holding part, with which the lens unit engages threadedly, in a barrel receiving portion of a pedestal mount, in a state, in which the barrel holding part is slidable in a circumferential direction and movable in an optical axis direction of the lens, arranging an elastic member in the barrel holding part received in the barrel receiving portion of the pedestal mount, fitting an interposing member onto the pedestal mount and interposing the elastic member between the interposing member and the barrel holding part, receiving an image pickup device, which receives light outgoing from the lens to convert the same into an electric signal to output the same, in an image pickup device receiving portion of the pedestal mount, regulating threading of the lens unit in the barrel holding part so that light outgoing from the lens forms an image in a light receiving region of the image pickup device, and injecting an adhesive onto threaded portions of the lens unit and the barrel holding part through a notch formed on the interposing member.

In order to solve the problem described above, a lens module according to the invention comprises a lens, by which light incident from outside is condensed and caused to outgo, a barrel, which holds the lens, a barrel holding part having a substantially cylindrical shape to hold therein the barrel, movement means for movement of the barrel holding part in an optical axis direction of the lens, and a pedestal mount having a receiving portion, which receives therein the barrel holding part in a slidable state, the pedestal mount receiving therein the barrel holding part contacting in plural lines with an inner wall surface of the receiving portion of the pedestal.

Here, according to a feature that intervals of those lines, at which the inner wall surface of the receiving portion of the pedestal mount contacts with the barrel holding part, are determined on the basis of a diameter of a virtual inscribing circle defined by connecting the plural contacting lines, an outside diameter of the barrel holding part, and an amount of offset being permissible for an optical axis of the lens, it is possible to reduce lines, which contact with the barrel holding part, in a permissible range, thus also enabling friction when the barrel holding part slides.

Also, according to a feature that the pedestal mount is formed on the inner wall surface of the receiving portion of the pedestal mount with a plurality of projections and receives therein the barrel holding part with the projections contacting therewith, it is possible to realize line contact in a simple construction.

Further, according to a feature that the receiving portion of the pedestal mount includes a polygonal-shaped inner wall surface, it is possible to realize line contact in a simple construction.

In order to solve the problem described above, a lens module according to the invention comprises a lens, by which light incident from outside is condensed and caused to outgo, a barrel, which holds the lens, a barrel holding part having a substantially cylindrical shape to hold therein the barrel, movement means for movement of the barrel holding part in an optical axis direction of the lens, and a pedestal mount having a receiving portion, which receives therein the barrel holding part, and receiving therein the barrel holding part in a state of being slidable in contact with a plurality of projections formed on an inner wall surface of the receiving portion.

Here, according to a feature that the movement means comprises a recess or a projection formed on a lower end surface of the barrel holding part to contact with an inner bottom surface of the receiving portion of the pedestal mount, and a projection or a recess formed on the inner bottom surface of the receiving portion of the pedestal mount to correspond to the recess or the projection on the lower end surface of the barrel holding part, and that when the barrel holding part is rotated to cause the recess or the projection on the barrel holding part to engage with the projection or the recess on the pedestal mount, the barrel holding part is moved to a first position in the optical axis direction of the lens, and when the barrel holding part is rotated to cause the recess or the projection on the barrel holding part not to engage with the projection or the recess on the pedestal mount, the barrel holding part is moved to a second position in the optical axis direction of the lens, it is possible to move the barrel holding part to the first or second position in the optical axis direction.

Also, according to a feature that there is further provided an elastic member, which pushes a lower end surface of the barrel holding part against an inner bottom surface of the receiving portion of the pedestal mount, it is possible to surely perform positioning of the barrel holding part at the time of mode switching.

Further, according to a feature that there is further provided a lever connected to the barrel holding part and that two stoppers, which restricts a range of movement of the lever of the barrel holding part, are formed at a predetermined interval on the pedestal mount and when the lever abuts against either of the stoppers, the barrel holding part is held in either of the first and second positions in the optical axis direction, mode switching can be performed by operating the lever.

Furthermore, according to a feature that an annular recess, into which a lower end surface of the barrel holding part enters, is formed on an inner bottom surface of the receiving portion of the pedestal mount, and in a state, in which the lower end surface of the barrel holding part enters into the annular recess of the pedestal mount, a clearance between an inner wall surface of the barrel holding part and an inner peripheral side wall surface of the annular recess is smaller than a small piece generated by sliding of the barrel holding part in the receiving portion of the pedestal mount, it is possible to confine small pieces generated by sliding.

In order to solve the problem described above, a camera module according to the invention comprises a lens, by which light incident from outside is condensed and caused to outgo, a barrel, which holds the lens, a barrel holding part having a substantially cylindrical shape to hold therein the barrel, movement means for movement of the barrel holding part in an optical axis direction of the lens, a pedestal mount having a receiving portion, which receives therein the barrel holding part, and receiving therein the barrel holding part in a state of being slidable in contact with a plurality of projections formed on an inner wall surface of the receiving portion, and an image pickup device received in the pedestal mount to receive light, which outgoes from the lens, in a light receiving region to convert the same into an electric signal to output the same.

According to the invention, it is possible to provide a small-sized camera module, or the like, enabling an adhesive to be easily injected onto a threaded portion between a lens unit and a barrel holding part.

According to the invention, it is possible to provide a lens module, or the like, in which an optical axis offset at the time of mode switching is restricted to a tolerance and a favorable photographing quality is maintained, in camera modules with a mode switching function.

DESCRIPTION OF THE PREFERRED EMBODIMENT

An embodiment of the invention will be described in detail below with reference to the accompanying drawings.

Figure 1:
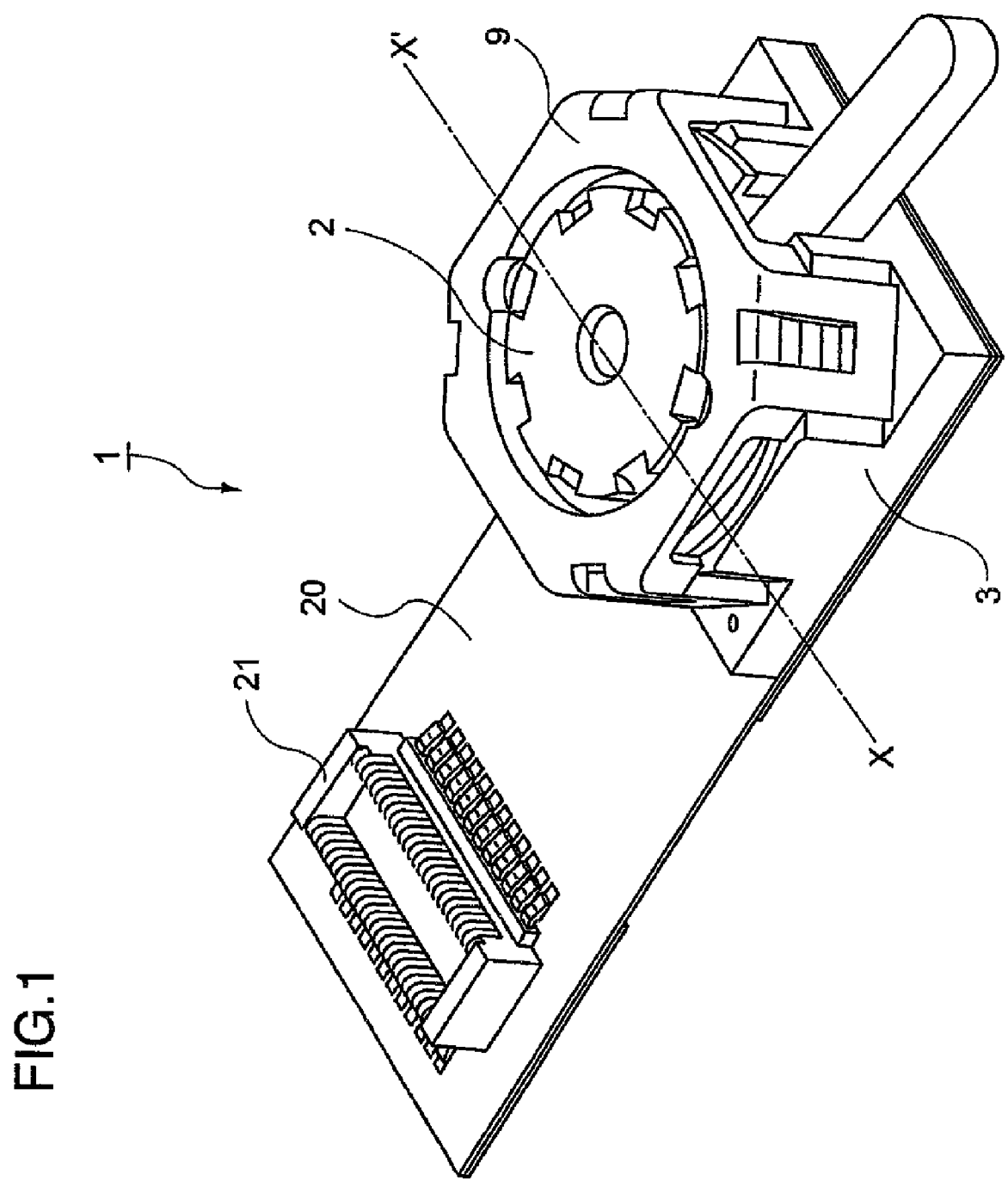
FIG. 1 is a perspective view showing an outward appearance of a camera module according to an embodiment.
Figure 2:
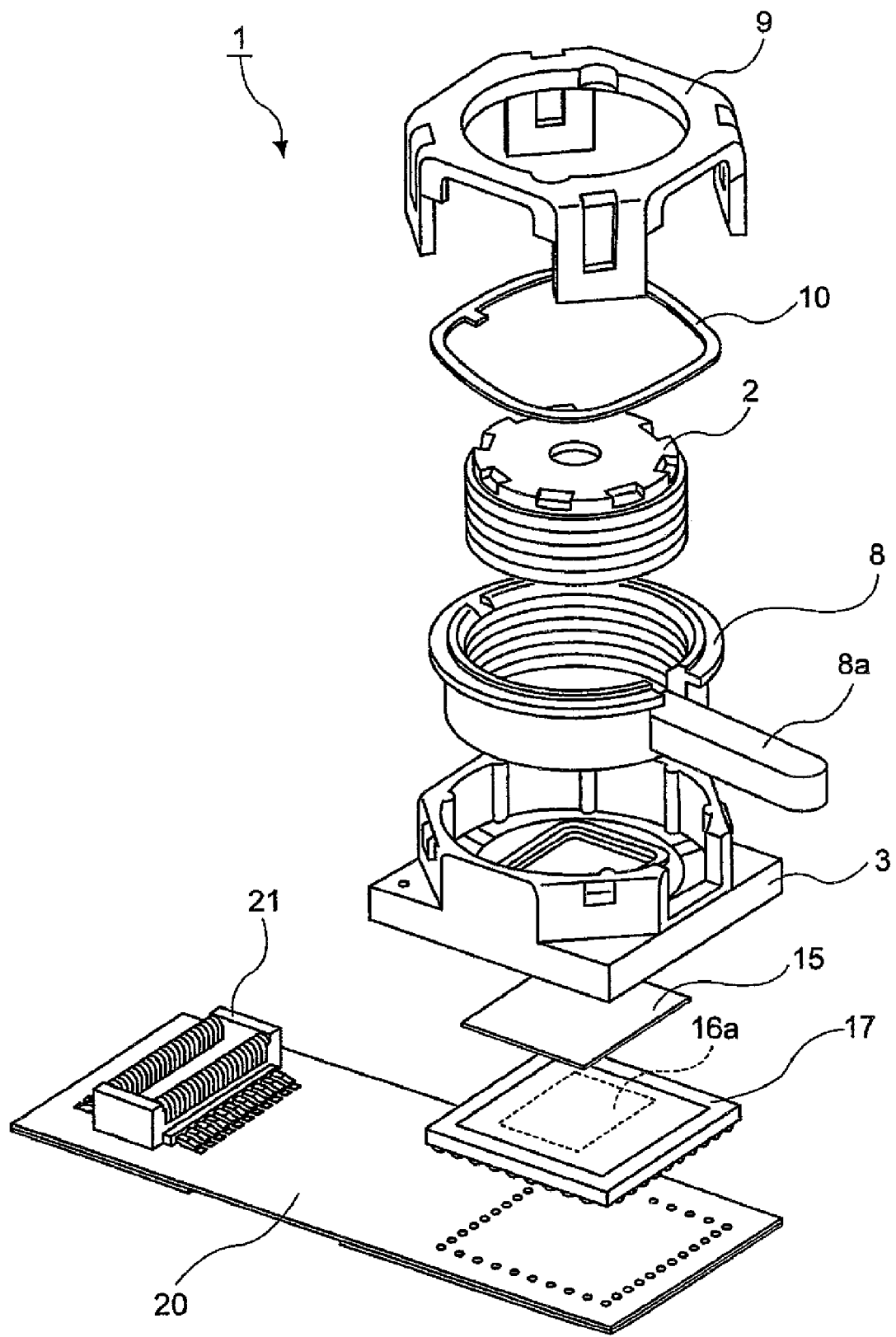
FIG. 2 is an exploded, perspective view showing the camera module shown in FIG. 1.

FIG. 1 is a perspective view showing an outward appearance of a camera module 1 according to the embodiment and FIG. 2 is an exploded, perspective view showing the camera module 1 according to the embodiment.

As shown in FIGS. 1 and 2, the camera module 1 includes a lens unit 2 receiving and holding a plurality of lenses, by which light incident from outside is condensed and caused to outgo (see FIG. 3), and performing image-formation of an incident light in a light receiving area (imaging area) 16a (see FIG. 3) of a sensor 16 (see FIG. 3), and a pedestal 3 as an example of a pedestal mount, which holds the lens unit 2. A spring presser 9 as an example of an interposing member is fitted onto and mounted to the pedestal 3. Formed on the spring presser 9 are notches 9a, through which an adhesive 25 (see FIG. 3) is injected onto threaded portions of the lens unit 2 and a barrel holding part 8 after image-formation (described later) of the lens unit 2 is regulated. Also, a lever 8a of the barrel holding part 8 (see FIG. 3) described later projects from between the spring presser 9 and the pedestal 3.

The pedestal 3 is bonded to a circuit board 20 by means of an adhesive (depiction of which is omitted). A connector 21 is connected to an opposite end of the circuit board 20 to a position, in which the pedestal 3 is bonded. The pedestal 3 is connected electrically to the connector 21 by a circuit pattern (not shown) embedded in the circuit board 20.

As shown in FIG. 2, the camera module 1 includes the lens unit 2, which receives and holds a plurality of lenses, and the barrel holding part 8 having the lens unit 2 threaded thereinto and fixed thereto by means of an adhesive. Also, the camera module 1 includes a spring 10 as an example of an elastic member, which contacts with and pushes an outer edge of an upper end surface of the barrel holding part 8 so as to hold the barrel holding part 8 in a state of being received in a lens receiving portion 3a (described later) of the pedestal 3, and the spring presser 9 fitted onto and mounted to the pedestal 3 to interpose the spring 10 between it and the barrel holding part 8. The spring presser 9 is fitted onto and fixed to the pedestal 3.

The barrel holding part 8, into which the lens unit 2 is threaded, is received in the pedestal 3. Also, the camera module 1 includes a filter 15 for removal of specific frequency of external light, a sensor 16 (see FIG. 3) as an example of an image pickup device, by which light incident upon the light receiving area 16a is converted into an electric signal, and a square glass cover 17 arranged between the filter 15 and the sensor 16.

Figure 3:
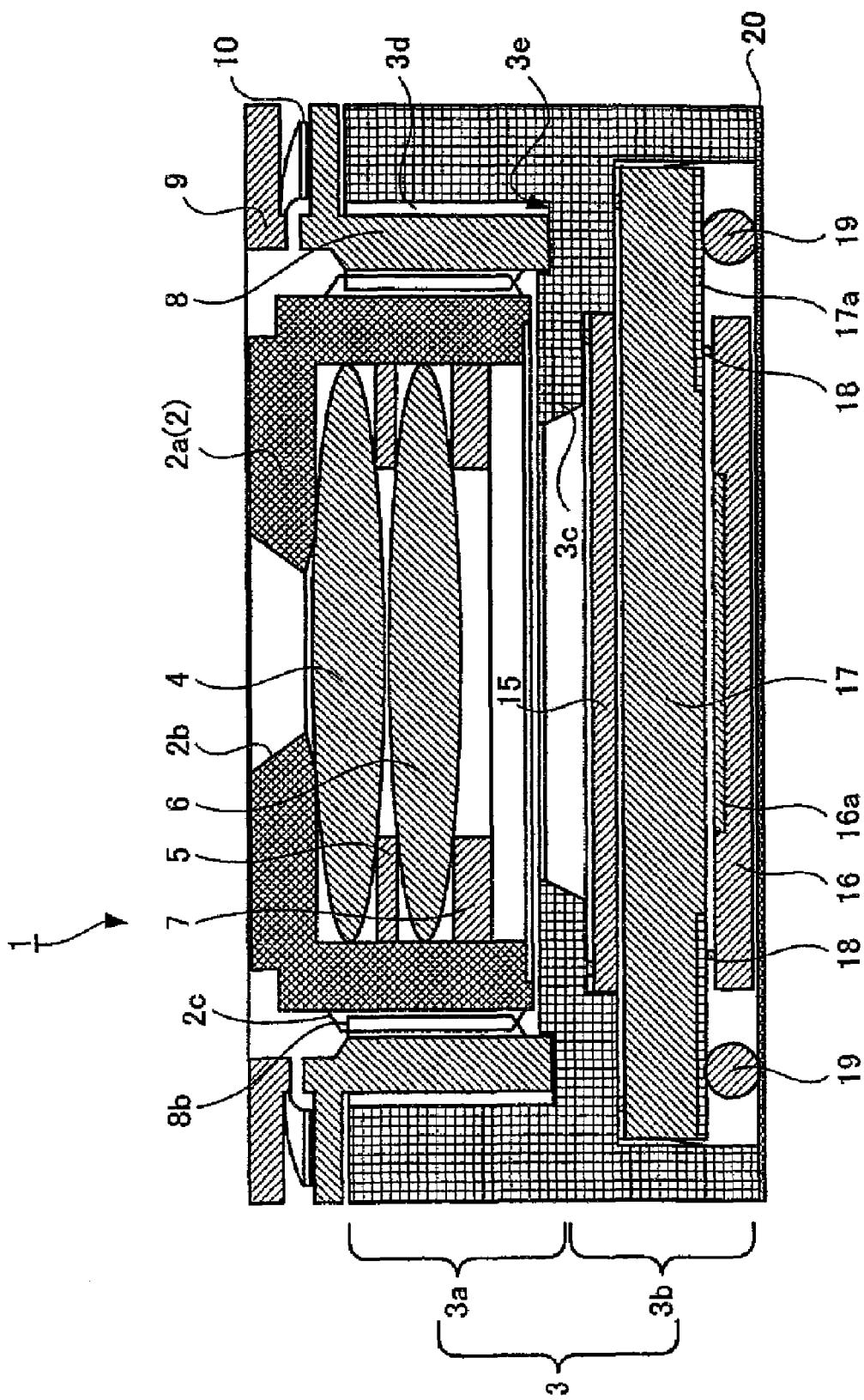
FIG. 3 is a longitudinal, cross sectional view taken along the line X-X' in FIG. 1 to show the camera module.

FIG. 3 is a longitudinal, cross sectional view taken along the line X-X' in FIG. 1 to show the camera module 1.

As shown in FIG. 3, the lens unit 2 holds a first lens 4, which is arranged on an incident side, and a second lens 6, which is arranged on an outgoing side, in a substantially cylindrical-shaped barrel 2a constituting a body of the lens unit 2. Also, the lens unit 2 includes an intermediate ring 5 between the first and second lenses 4, 6. Further, the lens unit 2 includes a lens presser 7 to hold the second lens 6 in a predetermined position.

The barrel 2a is substantially cylindrical-shaped. An opening 2b is formed on an end surface side of the barrel 2a, on which external light is incident. The barrel 2a is formed on an outer peripheral surface thereof with male threads 2c.

The barrel 2a is formed from a synthetic resin, such as a black-colored polycarbonate (PC) resin, liquid crystal polymer (LCP), polybutylene terephthalate (PBT) resin, polyphthalamide (PFA) resin, PEEK (polyether etherketone) resin, etc., which has a light shielding property.

The first and second lenses 4, 6 comprise an optical element, through which external light is transmitted to form an image in the light receiving area (imaging area) 16a of the sensor 16. That is, the first and second lenses 4, 6 form a predetermined optical system so that external light incident from the opening 2b of the barrel 2a is caused by the first and second lenses 4, 6 to form an image in the light receiving area 16a of the sensor 16. In addition, while the lens unit 2 comprises two lenses, that is, the first and second lenses 4, 6 in the embodiment, it does not matter whether it comprises one or three lenses. The predetermined optical system comprises a single lens or a plurality of lens groups.

The first and second lenses 4, 6 are formed from a thermoplastic resin such as a transparent polycarbonate (PC) resin, cyclic olefin (COP) resin, etc., or a material, such as silicone resin, glass, etc., which is translucent.

The intermediate ring 5 is in the form of a thin, circular ring. The intermediate ring 5 is formed from a synthetic resin film such as drawn polyester (PET), etc. The intermediate ring 5 has a diaphragm function of maintaining a face-to-face dimension between the first lens 4 and the second lens 6 and restricting a transmission quantity of light and is used optical diaphragm for determination of an aperture diameter of the optical system, or a shielding diaphragm for shielding of unnecessary light such as ghost, flare, etc.

The lens presser 7 is in the form of a substantially circular ring. The lens presser 7 is formed from, for example, a black-colored polycarbonate (PC) resin, etc. The lens presser is bonded to an inner wall surface of the barrel 2a by means of an adhesive (not shown).

The lens unit 2 is threaded into the barrel holding part 8. The spring 10 is mounted to an upper portion of the barrel holding part 8 and the spring presser 9 is fitted in a predetermined position on the pedestal 3 whereby the barrel holding part 8, into which the lens unit 2 is threaded, is received in the lens receiving portion 3a of the pedestal 3.

Here, a configuration of the barrel holding part 8 will be described with reference to the drawings.

Figure 4:
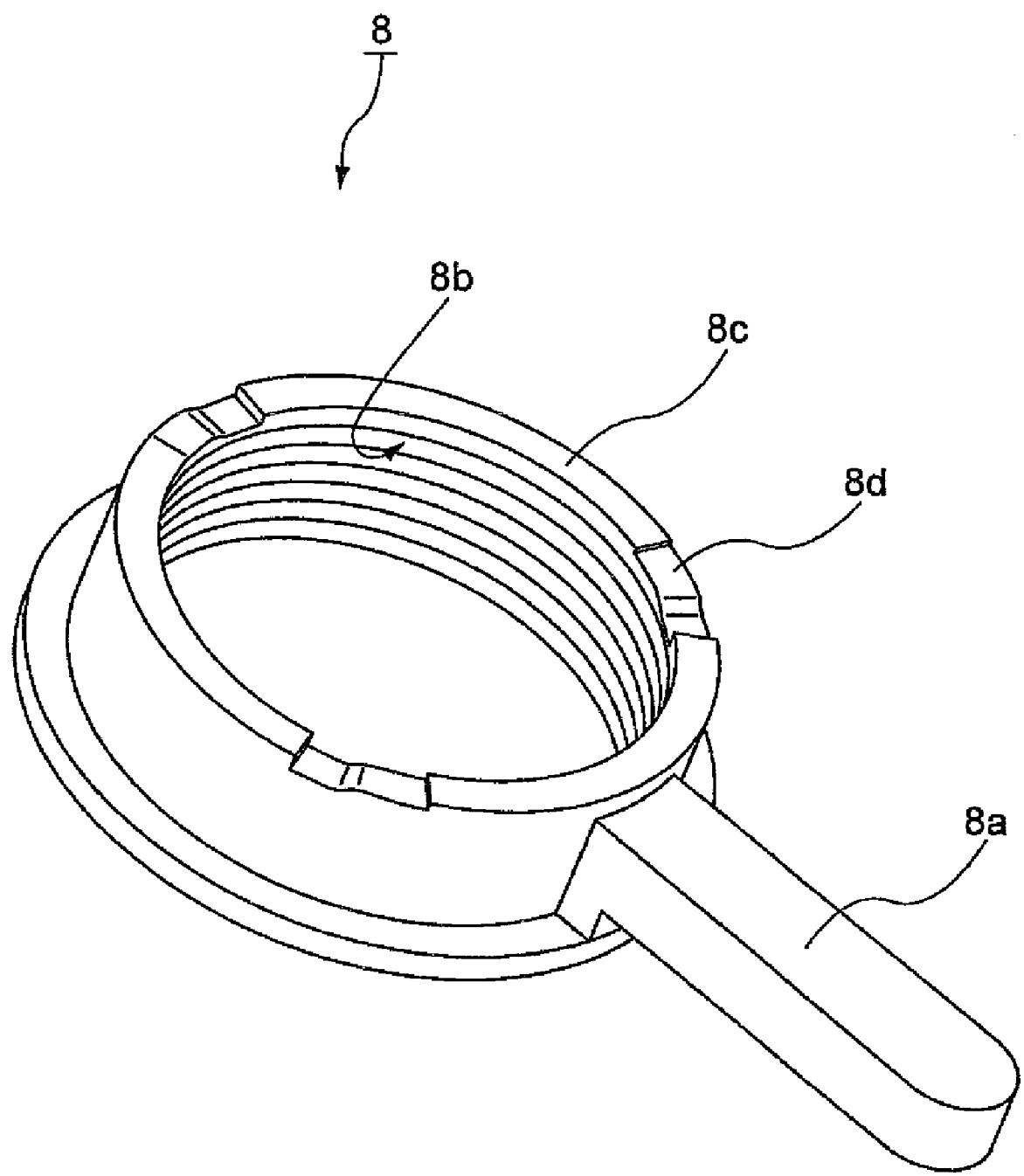
FIG. 4 is a perspective view showing a barrel holding part of the camera module shown in FIG. 1.

FIG. 4 is a perspective view showing the barrel holding part 8.

The barrel holding part 8 is formed from a synthetic resin, such as a black-colored polycarbonate (PC) resin, liquid crystal polymer (LCP), polybutylene terephthalate (PBT) resin, polyphthalamide (PEA) resin, PEEK (polyether etherketone) resin, polyacetal (POM) resin, etc., which has a light shielding property.

As shown in FIG. 4, the barrel holding part 8 is in the form of a substantially cylinder and formed on an outer peripheral surface thereof with the lever 8a, which projects therefrom. The lever 8a (see FIGS. 1 and 2) is operated whereby the barrel holding part 8 slidingly rotates in the lens receiving portion 3a (see FIG. 3) of the pedestal 3 (see FIG. 3). Also, the barrel holding part 8 is formed on an inner wall surface thereof with female threads 8b, which are threaded onto male threads 2c of the barrel 2a. A taper 8c is formed on an opening of the female threads 8b. Three recesses 8d are formed substantially evenly and circumferentially on a lower end surface 8c of a side wall portion of the barrel holding part 8.

The barrel holding part 8 is set on the pedestal 3 in a state, in which it receives the lens unit 2. At this time, the lower end surface of the barrel holding part 8 abuts against a bottom surface of an annular recess 3e formed on the lens receiving portion 3a of the pedestal 3.

Returning to FIG. 3, an explanation is given.

The barrel holding part 8 is set on the pedestal 3 in a state, in which it receives the lens unit 2. At this time, the lower end surface 8c (see FIG. 4) of the barrel holding part 8 abuts against the bottom surface of the annular recess 3e formed on the lens receiving portion 3a of the pedestal 3. In a state, in which the lower end surface 8c of the barrel holding part 8 enters the annular recess 3e of the pedestal 3, a clearance between the inner wall surface of the barrel holding part 8 and an inner peripheral side wall surface of the annular recess 3e is defined so as to become smaller than small pieces (abrasion dust) generated by sliding of the barrel holding part 8 slides in the lens receiving portion 3a of the pedestal 3. Thereby, the abrasion dust as generated upon sliding is confined and prevented from entering the light receiving area 16a.

Projections 3f (see FIG. 5) are formed on an inner bottom surface of the lens receiving portion 3a of the pedestal 3 to correspond to the recesses 8d (see FIG. 4) of the barrel holding part 8. They are described later.

The spring presser 9 includes a circular ring portion, which interposes and holds the spring 10 in a state of covering the spring 10 described later in a manner to hold the same, and a skirt portion formed around the circular ring portion. The skirt portion is fitted into the pedestal 3 whereby the spring presser 9 is fixed to the pedestal 3. The spring presser 9 is arranged with the barrel 2a entering a hole of the circular ring portion.

The notches 9a, through which an adhesive 25 is injected onto threaded portions of the male threads 2c of the barrel 2a and the female threads 8b of the barrel holding part 8, are provided in positions of center symmetry, for example, two positions on an inner peripheral side wall surface of the circular ring portion of the spring presser 9 (see FIG. 2). The notches 9a prevent the spring presser 9 from being formed in a position away from a position, in which the spring presser 9 cooperates with the barrel holding part 8 to interpose therebetween the spring 10 described later, to permit the adhesive 25 as injected to contact with the spring 10.

The spring presser 9 is formed from a synthetic resin, such as a black-colored polycarbonate (PC) resin, liquid crystal polymer (LCP), polybutylene terephthalate (PBT) resin, polyphthalamide (PFA) resin, PEEK (polyether etherketone) resin, ABS (acrylonitrile-butadiene-styrene) resin, etc., which has a light shielding property. Since the spring presser 9 is fitted onto and fixed to the pedestal 3 described later to be used, a material therefor is selected taking into consideration a difference in expansion between the spring presser and the pedestal 3 at a temperature in an environment of use of the camera module 1. For example, the same material as that of the pedestal 3 is preferable.

The spring 10 is in the form of a substantially circular ring and comprises a wavy thin sheet, on which a plurality of peaks and valleys are alternately formed at equal intervals in a circumferential direction. The spring is formed from a general spring material, such as phosphor bronze, SUS steel sheet, etc., of which thickness is in the order of 0.05 mm. The spring 10 contacts with and pushes the outer edge of the upper end surface of the barrel holding part 8 so as to hold a state, in which the barrel holding part 8 is received in the lens receiving portion 3a of the pedestal 3. The spring 10 together with the spring presser 9 functions to push the barrel holding part 8 downward from above. Thereby, the lower end surface of the barrel holding part 8 abuts against the bottom surface of the annular recess 3e of the pedestal 3.

The pedestal 3 is integrally formed from the lens receiving portion 3a as an example of a barrel receiving portion, to which the lens unit 2 is mounted, and a sensor receiving portion 3b as an example of an image pickup device receiving portion, in which the filter 15, the sensor 16, and the glass cover 17 are received and held. Also, the pedestal 3 is formed so that an inner space of the lens receiving portion 3a and an inner space of the sensor receiving portion 3b are made contiguous to each other. Also, the pedestal 3 includes a flange portion 3c formed to extend from an inner surface thereof to decrease the inner space.

Further, projections 3d are formed on an inner wall surface of the lens receiving portion 8a of the pedestal 3. Furthermore, an annular recess 3e is formed wholly circumferentially in a position, in which the lower end surface 8c of the barrel holding part 8 abuts against a bottom surface of the flange portion 3c toward the lens receiving portion 3a.

Here, a configuration of the pedestal 3 will be described with reference to the drawings.

Figure 5:
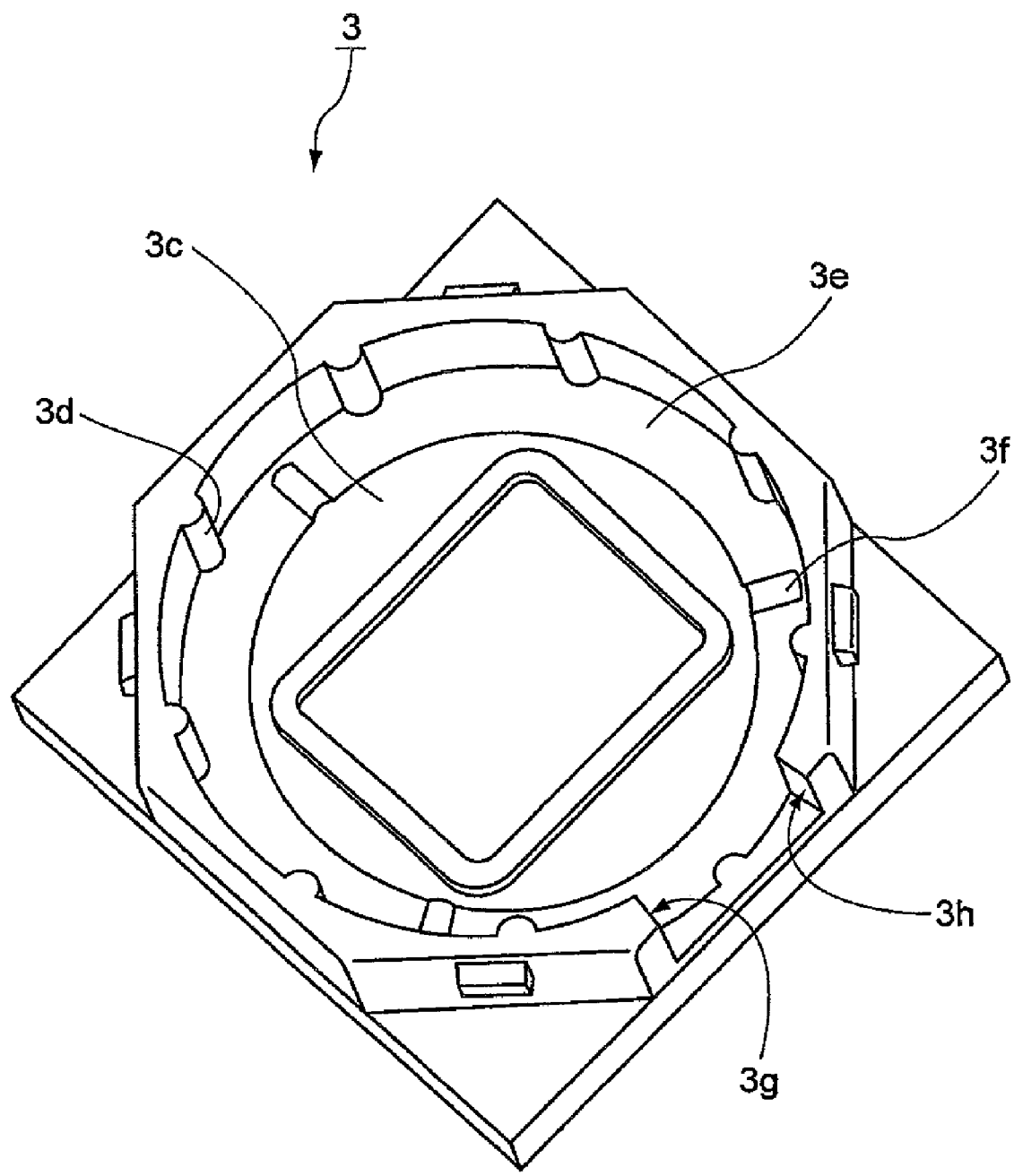
FIG. 5 is a perspective view showing a pedestal of the camera module shown in FIG. 1.

FIG. 5 is a perspective view showing the pedestal 3.

As shown in FIG. 5, the plurality of projections 3d as an example of a projection are formed on the inner wall surface of the lens receiving portion 3a (see FIG. 3) of the pedestal 3. The projections 3d contact with an outer wall surface of the barrel holding part 8 (see FIG. 3). Here, while the projections 3d in the embodiment are shown as being of a circular arc in cross section, they are not limited thereto but may be, for example, rectangular in cross section.

Also, the annular recess 3e is formed wholly circumferentially along the inner wall surface of the pedestal 3 on the bottom surface (a lower surface of the lens receiving portion 3a in FIG. 3) of the lens receiving portion 3a. Three projections 3f are formed substantially evenly and circumferentially on the bottom surface of the annular recess 3e. The projections 3f are formed corresponding to three recesses 8d formed on the lower end surface 8c of the barrel holding part 8. The projections will be described below with respect to the focus regulating function thereof. Further, the pedestal 3 is formed with two stoppers 3g, 3h, which restrict the range of movement of the lever 8a.

The pedestal 3 is formed from a synthetic resin, such as a black-colored polycarbonate (PC) resin, liquid crystal polymer (LCP), polybutylene terephthalate (PBT) resin, polyphthalamide (PFA) resin, PEEK (polyether etherketone) resin, etc., which has a light shielding property.

Returning to FIG. 3, an explanation is given.

The filter 15 is a member formed from a thin sheet for removal of specific frequency components of external light. According to the embodiment, there is used an infrared cut filter (IRCF) for removal of infrared rays owing to interference of light caused by a multilayer film. The filter 15 is mounted to the flange portion 3c of the pedestal 3. When the filter 15 is mounted to the flange portion 3c, an inner space of the pedestal 3 is compartmented into the lens receiving portion 3a and the sensor receiving portion 3b. The filter 15 is arranged in the vicinity of the sensor 16 to seal a side of the sensor 16, thereby preventing foreign matters from entering the side of the sensor 16.

The sensor 16 comprises an image sensor (image pickup device) such as CCD (Charge Coupled Device), CMOS (Complementary Metal Oxide Semiconductor), etc. According to the embodiment, there is used a sensor having a CSP (Chip Scale Package) structure. The sensor 16 generates and outputs an electric signal according to light, which forms an image in the light receiving area 16a, through the lens unit 2.

The glass cover 17 is arranged between the filter 15 and the sensor 16. Fixed to the glass cover 17 is the sensor 16 in a state, in which a surface of the sensor 16 toward the light receiving area 16a is directed toward the glass cover 17. Thereby, dust or the like is prevented from directly falling on the light receiving area 16a of the sensor 16.

The glass cover 17 is square shape. The glass cover 17 is formed from a transparent body, such as glass, silica glass, etc., which transmits therethrough visible light. A wiring pattern 17a is formed on a surface (a lower side in FIG. 3) of the glass cover 17 toward the image pickup device.

The wiring pattern 17a is beforehand arranged on an outgoing surface side (a lower surface in FIG. 3) of the glass cover 17. A plurality of solder bumps 18 are positioned in a manner to connect between electrodes of the wiring pattern 17a and the sensor 16. The solder bumps 18 mounted in positions of electrodes cause the sensor 16 to be connected to the glass cover 17 and to be connected electrically to electrodes of the glass cover 17.

A distance between the sensor 16 and the glass cover 17 is determined by a size of the solder bumps 18. Since it is easy to control the solder bumps 18 in size, it is possible to exactly position the sensor 16 and the glass cover 17. Also, since positioning is achieved by the plurality of solder bumps 18, a distance between the sensor 16 and the glass cover 17 is averaged.

Solder bumps 19 are arranged in separate positions of the electrodes on the outgoing surface side of the glass cover 17. The solder bumps 19 ensure electric connection between the glass cover 17 and the circuit board 20. The solder bumps 19 are also used as a spacer, by which the sensor 16 fixed to the glass cover 17 and the circuit board 20 are made away from each other.

The circuit board 20 is formed from an insulating material, which is mainly composed of, for example, glass fiber and an expoxy resin, and formed on a surface thereof with a conductor foil layer such copper or the like, and a nonconductor covers the conductor foil layer to protect the same. The circuit board 20 used in the embodiment has a thickness of about 0.3 mm or more. In addition, the circuit board may be formed from a flexible printed board mainly composed of polyimide resin.

(Focus Regulating Function)

The focus regulating function of the camera module 1 constructed in the manner described above will be described.

When the lever 8a is operated whereby the barrel holding part 8 is rotated in the lens receiving portion 3a of the pedestal 3, the lower end surface 8c of the barrel holding part 8 slidingly rotates in a state of abutting against the annular recess 3e of the pedestal 3. At this time, since the barrel holding part 8 is exerted by a force in a direction, in which it is pushed against the pedestal 3, by the spring presser 9 and the spring 10, the barrel holding part 8 will not be lifted.

When the lever 8a is operated and the barrel holding part 8 is rotated, the recesses 8d of the barrel holding part 8 come to positions corresponding to the projections 3f formed on the annular recess 3e of the lens receiving portion 3a of the pedestal 3. The barrel holding part 8 is pushed downward by the force of the spring 10 and the recesses 8d formed on the lower end surface 8c of the barrel holding part 8 are fitted onto the projections 3f formed on the annular recess 3e of the pedestal 3. Thereby, the lens unit 2 comes to a position (first position) close to the sensor 16. At this time, the lens unit 2 is regulated so that its focus position is put in an infinity mode (standard photographing mode).

The lever 8a is operated in an opposite direction whereby the barrel holding part 8 is caused to slidingly rotate in a reverse direction. The lower end surface 8c of the barrel holding part 8 gets over the projections 3f formed on the annular recess 3e of the pedestal 3 and the barrel holding part 8 is lifted to a position (second position) away from the sensor 16. At this time, the lens unit 2 is regulated so that its focus position is put in a close-up photographing mode.

In this manner, by operating the lever 8a, the lens unit 2 can be set in an infinity mode or a close-up photographing mode. Therefore, the projections 3f formed on the annular recess 3e of the pedestal 3 and the recesses 8d of the barrel holding part 8 function as an example of movement means for movement of the barrel holding part 8 in a direction along an optical axis of the lens unit 2. In addition, after all parts of the camera module are assembled, the camera module 1 is subjected to focus adjustment and bonded by means of an adhesive (not shown) whereby setting of an infinity mode or a close-up photographing mode is assured. In addition, recesses may be formed on the annular recess 3e of the pedestal 3, projections may be formed on the barrel holding part 8, and the barrel holding part 8 may be moved in a direction along the optical axis of the lens unit 2.

(Measures Against Optical Axis Offset)

Subsequently, an explanation will be given to the relationship between the lens receiving portion 3a of the pedestal 3 and the barrel holding part 8 and an optical axis offset of the lens unit 2.

Figure 6:
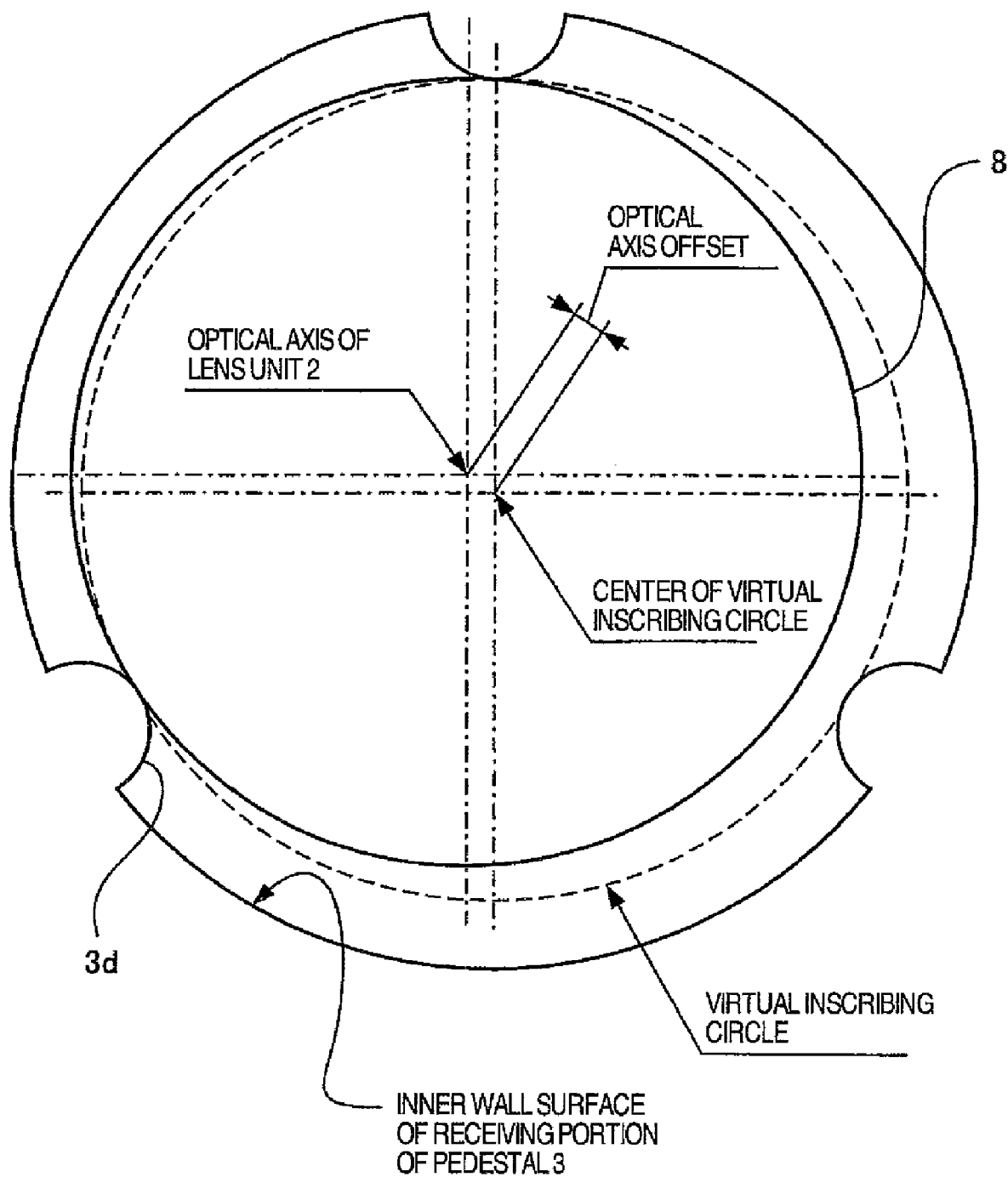
FIG. 6 is a view illustrating an optical axis offset in the camera module shown in FIG. 1.

FIG. 6 is a view illustrating an optical axis offset in the camera module 1 shown in FIG. 1. Here, while FIG. 5 shows a view, in which nine projections 3d are formed on the inner wall surface of the lens receiving portion 3a, FIG. 6 shows three projections 3d for the sake of simplification of illustration and the convenience of explanation.

As shown in FIG. 6, the side wall surface of the barrel holding part 8 contacts with the projections 3*d* formed on the inner wall surface of the lens receiving portion 3*a* of the pedestal 3. At this time, a distance between a center of a virtual inscribing circle (indicated by a broken line in FIG. 6) inscribing the projections 3*d* formed on the inner wall surface of the lens receiving portion 3*a* of the pedestal 3 and a center of the barrel holding part 8 (that is, an optical axis of the lens unit 2) corresponds to an optical axis offset. Since the optical axis offset has influences on an imaging quality, it is preferable to make a center distance between the virtual inscribing circle and the barrel holding part 8 as small as possible. As a method of decreasing the center distance, there are conceivable: (1) a method of increasing the number of the projections 3*d* formed on the inner wall surface of the lens receiving portion 3*a* of the pedestal 3 to reduce an amount, by which the barrel holding part 8 enters between adjacent projections 3*d*, or (2) a method of decreasing a difference between a diameter of a virtual inscribing circle inscribing a plurality of projections 3*d* formed on the lens receiving portion 3*a* of the pedestal 3 and an outside diameter of the barrel holding part 8, or the like.

(1) A Method of Increasing the Number of the Projections 3*d*

Where an outside diameter of the barrel holding part 8 was φ 7.00 mm and a diameter of a virtual inscribing circle inscribing the projections 3*d* formed on the inner wall surface of the lens receiving portion 3*a* of the pedestal 3 was φ 7.05 mm, the relationship between the number of the projections 3*d* and an amount of optical axis offset was calculated. TABLE 1 shows the results. It is found that when six or more of the projections 3*d* were formed, an amount of optical axis offset became equal to or less than 5 μm to have no influence on the imaging quality. In this manner, when an outside diameter of the barrel holding part 8, a diameter of a virtual inscribing circle inscribing a plurality of projections 3*d*, and a permissible amount of optical axis offset are determined, it is possible to determine the number of the projections 3*d* formed on the inner wall surface of the lens receiving portion 3*a*.

TABLE 1

| NUMBER OF PROJECTIONS | AMOUNT OF OPTICAL AXIS OFFSET |
|---|---|
| 3 | 25.5 |
| 4 | 10.5 |
| 5 | 6.0 |
| 6 | 3.9 |
| 7 | 2.8 |
| 8 | 2.1 |
| 9 | 1.6 |
| 10 | 1.3 |

(2) A Method of Decreasing a Difference Between a Diameter of a Virtual Inscribing Circle Inscribing the Projections 3*d* and an Outside Diameter of the Barrel Holding Part 8

In order to decrease a difference between a diameter of a virtual inscribing circle inscribing a plurality of projections 3*d* formed on the lens receiving portion 3*a* of the pedestal 3 and an outside diameter of the barrel holding part 8, a difference between an outside diameter of the barrel holding part 8 and a diameter of a virtual inscribing circle inscribing the projections 3*d* formed on the inner wall surface of the lens receiving portion 3*a* of the pedestal 3 was made 0 to 0.025 mm in the embodiment. Since the barrel holding part 8 is held in contact with the plurality of projections 3*d* formed on the inner wall surface of the lens receiving portion 3*a* of the pedestal 3, the projections 3*d* and the outer wall surface of the barrel holding part 8 were put in surface-line contact with each other, thus enabling reducing friction. It was confirmed that even when an outside diameter of the barrel holding part 8 and a diameter of a virtual inscribing circle defined by the projections 3*d* of the pedestal 3 were made the same as each other, friction could be reduced.

In addition, by forming the projections 3*d* on the inner wall surface of the lens receiving portion 3*a* of the pedestal 3, abrasion dust (small pieces) generated by abrasion enters between adjacent projections 3*d* and so does not obstruct sliding of the barrel holding part 8 and the projections 3*d*.

For comparison, a configuration of a conventional pedestal is shown.

Figure 7:
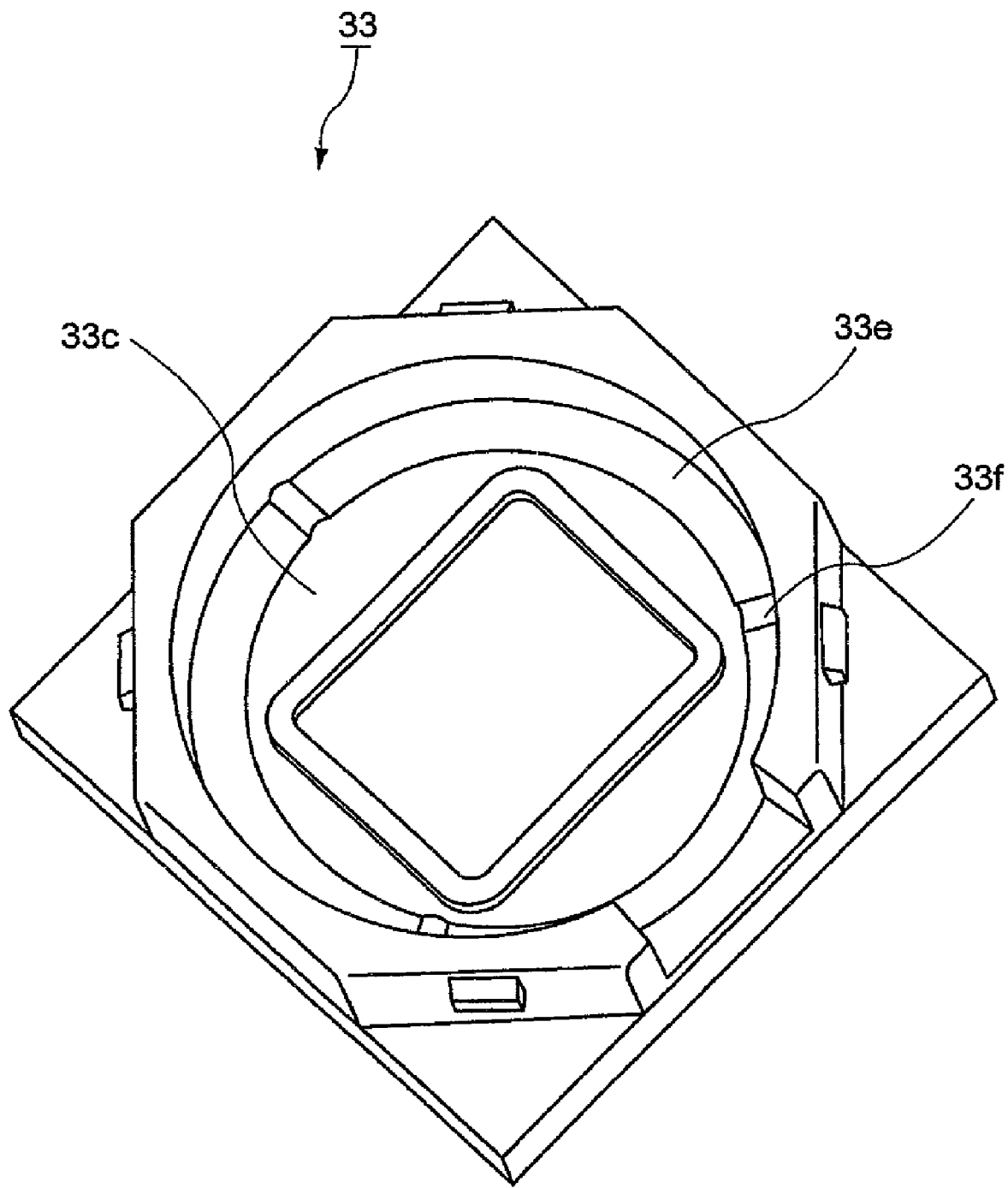
FIG. 7 is a perspective view showing a conventional pedestal.

FIG. 7 is a perspective view showing a conventional pedestal 33.

As shown in FIG. 7, the conventional pedestal 33 includes a flange portion 33*c* formed to extend from an inner wall surface thereof to decrease an inner space. Also, an annular recess 33*e* is formed wholly circumferentially along the inner wall surface. Three projections 33*f* are formed substantially evenly and circumferentially on a bottom surface of the annular recess 33*e*. All the flange portion 33*c*, the annular recess 33*e*, and the projections 33*f* function in the same manner as the flange portion 3*c*, the annular recess 3*e*, and the projections 3*f* of the pedestal 3 shown in FIG. 5. Since any projections are not formed on an inner wall surface of a lens receiving portion of the pedestal 33, a barrel holding part 8 (see FIG. 4) and the lens receiving portion of the pedestal 33 are put in surface-surface contact with each other, so that a contact area thereof increases. Also, when there is no clearance between an outer wall surface of the barrel holding part 8 and an inner wall surface of the lens receiving portion of the pedestal 33, the barrel holding part 8 cannot rotate in the lens receiving portion of the pedestal 33. When the barrel holding part were forcibly rotated, the lever 8*a* (see FIGS. 2 and 4) would be broken and a lot of abrasion dust would be generated due to abrasion.

(Modification)

While the projections 3*d* shown in FIG. 5 comprise a semi-circular projection, the invention is not limited thereto. As far as a contact area between the barrel holding part 8 and the lens receiving portion 3*a* of the pedestal 3 is decreased, there is no limitation in configuration. For example, an inner shape of the lens receiving portion 3*a* of the pedestal 3 may be rectangular (prismatic) (depiction of which is omitted).

Figure 8:
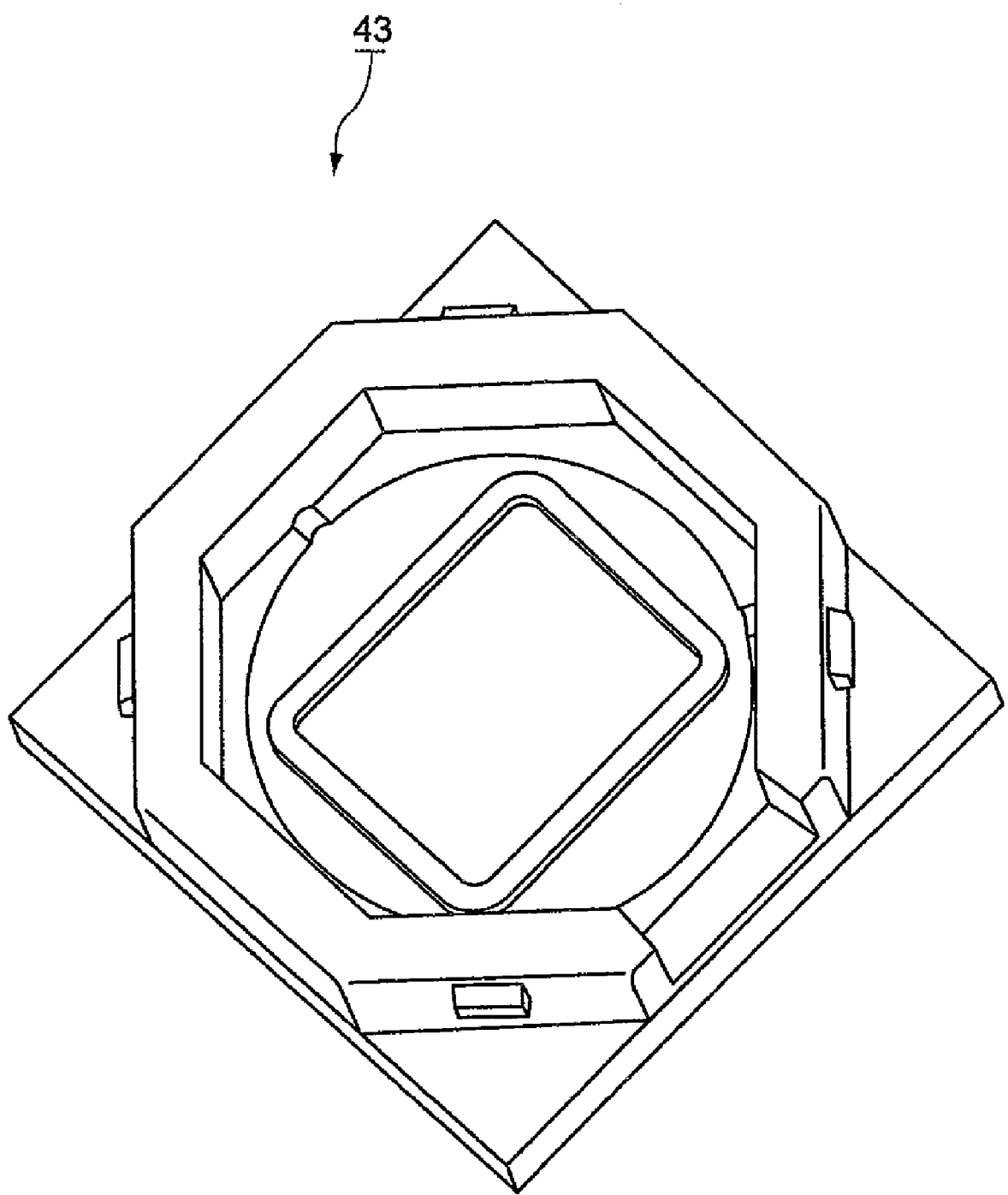
FIG. 8 is a perspective view showing a modification of a pedestal.

FIG. 8 is a perspective view showing a pedestal 43 as a modification. The pedestal is different from the pedestal 3 shown in FIG. 5 in that a barrel holding part of the pedestal 43 is in the form of not a circular hole but a rectangular hole.

As indicated in TABLE 1, the number of locations in contact with an outer peripheral surface of the barrel holding part 8 is preferably 6 or more under predetermined conditions, so that an inner shape of the lens receiving portion of the pedestal 43 is desirably a hexagon or more under the same conditions.

While in the embodiment shown in FIG. 5 the projections 3*d* on the inner wall surface of the lens receiving portion 3*a* of the pedestal 3 are formed at equal intervals on the inner wall surface, the invention is not limited thereto. When there is a tendency that the barrel holding part 8 is pushed toward an opposite side to the lever 8*a* by, for example, the operation of the lever 8*a*, the projections 3*d* may be decreased in number by enlarging intervals on a side close to the lever 8*a* and diminishing intervals on an opposite side (depiction of which is omitted). Since the number of locations, in which the barrel holding part 8 contacts with the projections 3d, is reduced, it is possible to reduce abrasion dust as generated.

Figure 9:
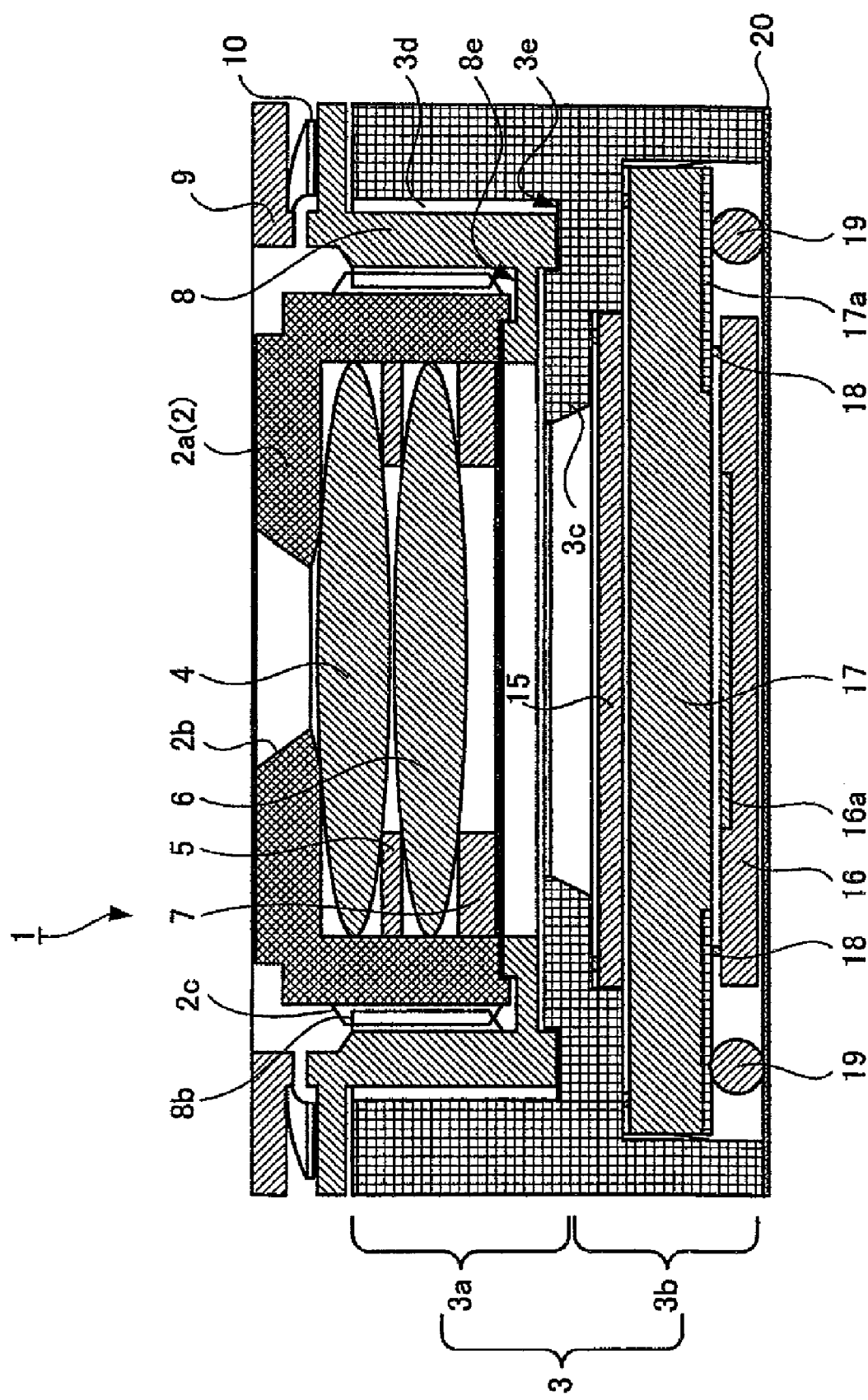
FIG. 9 is a longitudinal, cross sectional view showing a modification of a lens unit.

FIG. 9 is a longitudinal, cross sectional view showing a modification of a lens unit.

A barrel holding part 8 shown in FIG. 9 is different from the barrel holding part 8 shown in FIG. 3 in that a bottom surface portion is further formed to extend from an inner wall surface, on which female threads 8b are formed, and an annular recess 8e is formed on the bottom surface portion. A clearance between a barrel 2a and the annular recess 8e is formed to be small. That is, in a state, in which a lower end surface of the barrel 2a enters the annular recess 8e of the barrel holding part 8, a clearance between an inner wall surface of the barrel 2a and an inner peripheral side wall surface of the annular recess 8e is defined to become smaller than small pieces (abrasion dust) generated by threading of male threads 2c of the barrel 2a and female threads 8b of the barrel holding part B. Thereby, there is fulfilled a function of receiving and confining small pieces (abrasion dust) generated upon threading and a surplus adhesive (depiction of which is omitted) in bonding the barrel 2a to the barrel holding part 8.

In this manner, with the camera module 1 according to the embodiment, the barrel holding part 8 is held while an outer wall surface of the barrel holding part 8 contacts with a plurality of projections 3d formed on the inner wall surface of the lens receiving portion 3a. At this time, a diameter of a virtual inscribing circle inscribing the plurality of projections 3d formed on the lens receiving portion 3a of the pedestal 3, an outside diameter of the barrel holding part 8, and a permissible amount of optical axis offset of the lens unit 2 determine the number (that is, an interval between adjacent projections 3d) of projections 3d formed on the inner wall surface of the lens receiving portion 3a of the pedestal 3. Therefore, since the number of the projections 3d is determined according to a permissible amount of optical axis offset of the lens unit 2, it is possible to reduce the number of the projections 3d. Thereby, it is possible to decrease friction when the barrel holding part 8 rotates slidingly.

Also, the inner wall surface of the lens receiving portion 3a of the pedestal 3 and the outer wall surface of the barrel holding part 8 are put in line contact with each other and the barrel holding part 8 is held thereby. Thereby, since a conventional surface-surface contact is converted into surface-line contact, it becomes possible to decrease a contact area with a simple construction, thus enabling decreasing friction when the barrel holding part 8 rotates slidingly. Thereby, it becomes possible to suppress generation of abrasion dust caused by sliding at the time of mode switching.

Since small pieces (abrasion dust) generated upon sliding movements of the projections 3d on the lens receiving portion 3a of the pedestal 3 and the barrel holding part 8 are confined in a closed space defined by the annular recess 3e (recess) of the lens receiving portion 3a and a lower end surface 8c of the barrel holding part 8, it is possible to inhibit image spotting, which the small pieces fall on a filter 15 to generate. Thereby, only by contriving the internal construction of the camera module 1, it is possible to provide a camera module 1 of high photographing quality with little increase in manufacturing cost.

Also, with the pedestal 43 shown in FIG. 8, a diameter of a virtual inscribing circle inscribing the inner wall surface of the lens receiving portion of the pedestal 43, an outside diameter of the barrel holding part, and a permissible amount of optical axis offset of the lens unit 2 determine an internal shape of the lens receiving portion of the pedestal 43. Therefore, since the number of contact locations is determined according to a permissible amount of optical axis offset of the lens unit 2, it is possible to make the number of contact locations as small as possible with a simple construction. Thereby, it is possible to decrease friction when the barrel holding part rotates slidingly.

In the modification shown in FIG. 9, since small pieces (abrasion dust) generated upon threading of the male threads 2c of the barrel 2a and the female threads 8b of the barrel holding part 8 are confined in a closed space defined by the lower end surface of the barrel 2a and the annular recess 8e of the barrel holding part 8, it is possible to inhibit image spotting, which the small pieces fall on the filter 15 to generate.

Figure 10:
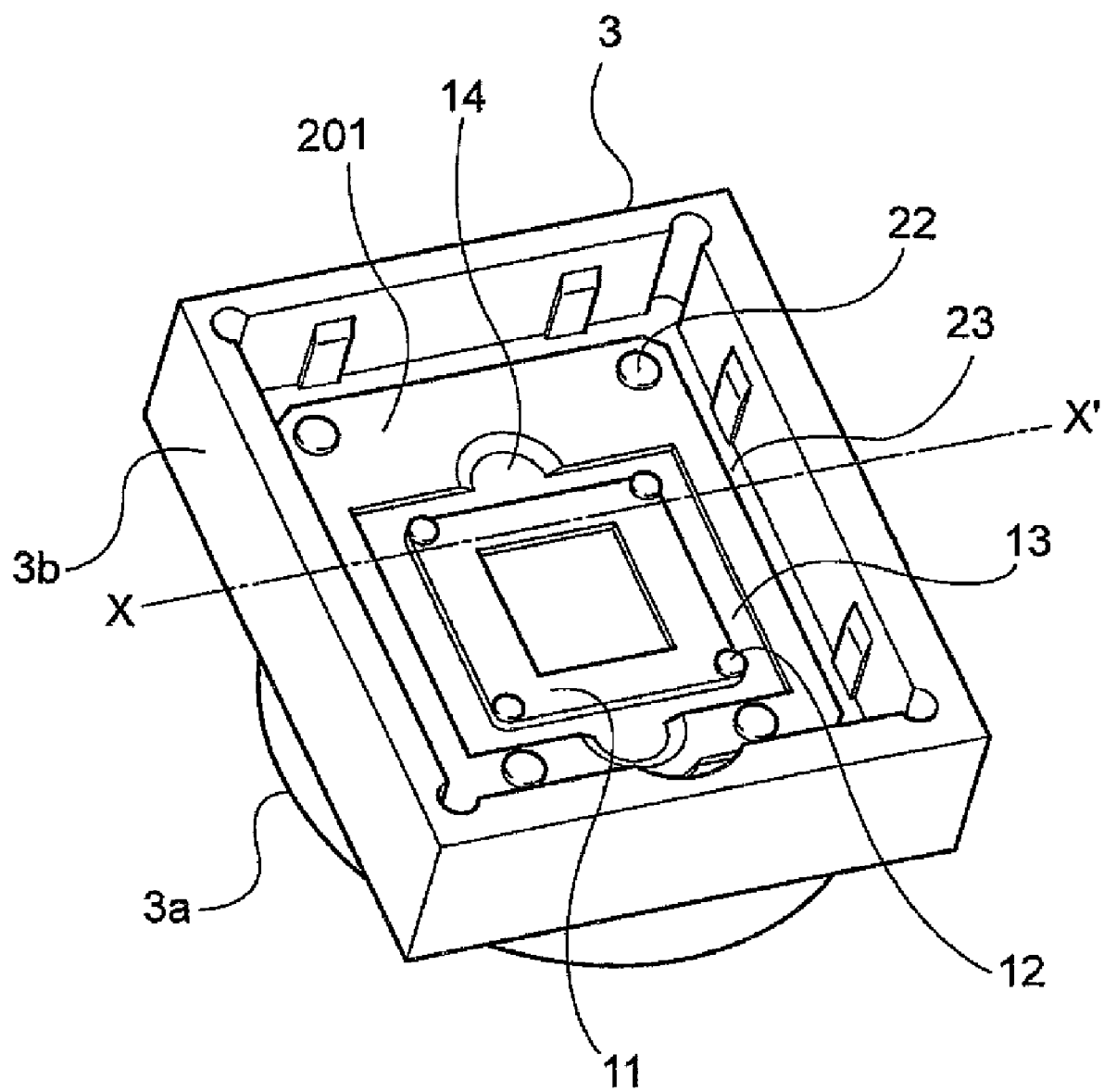
FIG. 10 is a perspective view showing a pedestal of the camera module shown in FIG. 1 as viewed from under.

FIG. 10 is a perspective view showing the pedestal 3 of the camera module 1 shown in FIG. 1 as viewed from under.

As shown in FIG. 3, a mount surface 11 for the filter 15 and a mount surface 201 for the glass cover 17 are defined on a bottom surface (the flange portion 3c) of the rectangular portion 3b of the pedestal 3.

The mount surface 11 for the filter 15 is dented and formed on an incident side of the flange portion 3c. That is, the mount surface 11 is formed to be recessed from the mount surface 201 for the glass cover 17 so that when the filter 15 is received abutting against abutments 12 (described later), an upper surface of the filter 15 does not project beyond the mount surface 201 for the glass cover 17.

In order to prevent the filter 15 from being mounted in an inclined state, the mount surface 11 of the pedestal 3 is formed with the abutments 12, which abut against the filter 15, a groove 13 for reception of an adhesive 108 (described later) for bonding of a whole periphery of the filter 15, and adhesive injection recesses 14, through which the adhesive 108 is injected into the groove 13.

Also, formed on the mount surface 201 of the pedestal 3 are abutments 22, which abut against the glass cover 17 to position the glass cover 17 in the direction of optical axes of the lenses 4, 6, and a groove 23, in which an adhesive for bonding of the glass cover 17 is received.

The abutments 12 are formed on four respective corners of the mount surface 11 for the filter 15 by means of integral molding. Here, while the number of the abutments 12 is not necessarily required to be four, it is desired that three or more abutments be formed so as to prevent the filter 15 from being mounted obliquely. Also, in view of a thickness of the filter 15 and a layer thickness of the adhesive 108 for fixation of the filter 15 to the mount surface 11, a height (height of the abutments 12) from the mount surface 11 for the filter 15 to the abutments 12 is determined.

The abutments 22 are formed on four respective corners of the mount surface 201 for the glass cover 17 by means of integral molding. Also, the abutments 22 are formed away from side wall portions of the rectangular portion 3b. In addition, the abutments 22 are not required to be four in number but are desirably formed three or more in number so that the glass cover 17 is made stable in a state of being perpendicular to optical axes of the lenses 4, 6. In view of a thickness of the glass cover 17 and a layer thickness of an adhesive for bonding of the pedestal 3 to a flexible board 24, a relative distance from the mount surface 201 for the glass cover 17 to upper surfaces of the abutments 22 is determined and then a height of the abutments 22 is determined based on the relative distance.

The groove 23 is formed circularly along the side wall portions of the rectangular portion 3b and over the corners of the mount surface 201. In the case where an adhesive applied on lower end surfaces of the side wall portions of the rectangular portion 3b to swell inside adheres to the glass cover 17 in bonding the pedestal 3 to the flexible board 24, the groove 23 receives the adhesive.

(Method of Manufacturing the Camera Module 1)

A method of manufacturing the camera module 1 having the above construction will be described.

Then, the first lens 4, the intermediate ring 5, and the second lens 6 are received in the barrel 2a and the lens presser 7 is mounted and bonded by means of an adhesive (not shown) to assemble a lens unit 2. The lens unit 2 thus assembled is threaded (temporarily fixed) into the barrel holding part 8.

Succeedingly, the barrel holding part 8, into which the lens unit 2 is threaded, is received in the lens receiving portion 3a of the pedestal 3. At this time, the barrel holding part 8 is received in a state of being slidable in a circumferential direction and movable in an optical axis direction.

The spring 10 is arranged at the outer edge of the upper end surface of the barrel holding part 8 received in the lens receiving portion 3a of the pedestal 3, the spring presser 9 is fitted onto the pedestal 3, the spring 10 is interposed between the spring presser 9 and the upper end surface of the barrel holding part 8.

The filter 15 is received in the sensor receiving portion 3b of the pedestal 3 and the sensor receiving portion 3b of the pedestal 3 is caused to cover the circuit board 20, on which the glass cover 17 mounting thereto the sensor 16 is mounted, in a manner to cover the glass cover 17.

Threading of the lens unit 2 in the barrel holding part 8 is regulated so that light outgoing from the lens unit 2 forms an image in the light receiving area 16a of the sensor 16. At this time, the lever 8a is operated to regulate image-formation so that focusing is achieved either in an infinity mode (standard photographing mode), in which the lens unit 2 is in a position (first position) close to the sensor 16, and in a close-up photographing mode, in which the barrel holding part 8 is in a position (second position) away from the sensor 16.

A nozzle 30 is inserted from the notches 9a formed on the spring presser 9 to have a tip end of the nozzle 30 contacting with the threaded portion. A predetermined quantity of the adhesive 25 is discharged from a dispenser (not shown), so that the adhesive 25 is injected onto the threaded portions of the lens unit 2 and the barrel holding part 8.

The camera module 1 is assembled in the procedure described above.

In this manner, with the camera module 1 according to the embodiment, the spring presser 9 is formed with the notches 9a, through which the adhesive 25 is injected onto the threaded portions of the male threads 2c of the barrel 2a and the female threads 8b of the barrel holding part 8, so that it is possible to easily inject the adhesive 25 onto the threaded portions.

Also, since the notches 9a are formed on the opening side of the female threads 8b of the barrel holding part 8, the adhesive 25 injected from the opening side of the female threads 8b can be permeated over the whole threaded portions.

Further, since the taper 8c is formed on the opening side of the female threads 8b of the barrel holding part 8, the adhesive 25 being injected can easily enter the threaded portions without overflowing.

Furthermore, since the spring 10 is arranged in a position away from the notches 9a, the adhesive 25 injected from the notches 9a does not contact with the spring 10.

The invention claimed is:

1. A lens module comprising:
    a lens unit including a lens, by which light incident from outside is condensed and caused to outgo, and a barrel, which receives therein the lens;
    a barrel holding part, with which the lens unit engages threadedly, and to which the lens unit is fixed by an adhesive;
    a pedestal mount including a barrel receiving portion, which receives therein the barrel holding part in a state of being slidable in a circumferential direction and movable in an optical axis direction of the lens, and an image pickup device receiving portion, which receives therein an image pickup device, which receives light outgoing from the lens to convert the same into an electric signal to output the same;
    an elastic member, which pushes the barrel holding part in a manner to maintain the same in a state of being received in the barrel receiving portion of the pedestal mount; and
    an interposing member, which is fitted onto the pedestal mount, and between which and the barrel holding part the elastic member is interposed,
    wherein the interposing member is formed with a notch, through which an adhesive is injected onto threaded portions of the lens unit and the barrel holding part.

2. The lens module according to claim 1, wherein an opening portion of those female threads of the barrel holding part, with which the lens unit engages threadedly, is tapered.

3. The lens module according to claim 1, wherein the elastic member is arranged in contact with an outer edge of an upper end surface of the barrel holding part, and
    the notch is formed in a position on the interposing member, which position is away from a position, in which the interposing member interposes the elastic member.

4. The lens module according to claim 1, wherein the pedestal mount receives therein the barrel holding part contacting in plural lines with an inner wall surface of the receiving portion of the pedestal mount.

5. The lens module according to claim 4, wherein intervals of those lines, at which the inner wall surface of the receiving portion of the pedestal mount contacts with the barrel holding part, are determined on the basis of a diameter of a virtual inscribing circle defined by connecting the plural contacting lines, an outside diameter of the barrel holding part, and an amount of offset being permissible for an optical axis of the lens.

6. The lens module according to claim 4, wherein the pedestal mount is formed on the inner wall surface of the receiving portion of the pedestal mount with a plurality of projections and receives therein the barrel holding part with the projections contacting therewith.

7. The lens module according to claim 4, wherein the receiving portion of the pedestal mount includes a polygonal-shaped inner wall surface.

8. The lens module according to claim 1, wherein the pedestal mount receives therein the barrel holding part in a state of being slidable in contact with a plurality of projections formed on an inner wall surface of the receiving portion.

9. The lens module according to claim 8, further comprising:
    movement means, which moves the barrel holding part in the optical axis direction of the lens;
    wherein the movement means comprises a recess or a projection formed on a lower end surface of the barrel holding part to contact with an inner bottom surface of the receiving portion of the pedestal mount; and
    a projection or a recess formed on the inner bottom surface of the receiving portion of the pedestal mount to correspond to the recess or the projection on the lower end surface of the barrel holding part;

wherein when the barrel holding part is rotated to cause the recess or the projection on the barrel holding part to engage with the projection or the recess on the pedestal mount, the barrel holding part is moved to a first position in the optical axis direction of the lens, and when the barrel holding part is rotated to cause the recess or the projection on the barrel holding part not to engage with the projection or the recess on the pedestal mount, the barrel holding part is moved to a second position in the optical axis direction of the lens.

10. The lens module according to claim 8, further comprising:

a lever connected to the barrel holding part;

wherein two stoppers, which restricts a range of movement of the lever of the barrel holding part, are formed at a predetermined interval on the pedestal mount;

when the lever abuts against either of the stoppers, the barrel holding part is held in either of the first and second positions in the optical axis direction.

11. The lens module according to claim 8, wherein an annular recess, into which a lower end surface of the barrel holding part enters, is formed on an inner bottom surface of the receiving portion of the pedestal mount, and in a state, in which the lower end surface of the barrel holding part enters into the annular recess of the pedestal mount, a clearance between an inner wall surface of the barrel holding part and an inner peripheral side wall surface of the annular recess is smaller than a small piece generated by sliding of the barrel holding part in the receiving portion of the pedestal mount.

12. A camera module comprising:

a lens unit including a lens, by which light incident from outside is condensed and caused to outgo, and a barrel, which receives therein the lens;

a barrel holding part, with which the lens unit engages threadedly, and to which the lens unit is fixed by an adhesive;

an image pickup device, which receives light outgoing from the lens to convert the same into an electric signal to output the same;

a pedestal mount including a barrel receiving portion, which receives therein the barrel holding part in a state of being slidable in a circumferential direction and movable in an optical axis direction of the lens, and an image pickup device receiving portion, which receives therein the image pickup device;

an elastic member, which pushes the barrel holding part to maintain the same in a state of being received in the barrel receiving portion of the pedestal mount; and an interposing member, which is fitted onto the pedestal mount, and between which and the barrel holding part the elastic member is interposed, wherein the interposing member is formed with a notch, through which an adhesive is injected onto threaded portions of the lens unit and the barrel holding part.

13. The camera module according to claim 12, comprising a pedestal mount, which receives therein the barrel holding part in a state of being slidable in contact with a plurality of projections formed on an inner wall surface of the receiving portion.

14. A method of manufacturing a camera module, the method comprising the steps of:

threadedly engaging a lens unit including a lens, by which light incident from outside is condensed and caused to outgo, and a barrel, which receives therein the lens, with a barrel holding part;

receiving the barrel holding part, with which the lens unit engages threadedly, in a barrel receiving portion of a pedestal mount, in a state, in which the barrel holding part is slidable in a circumferential direction and movable in an optical axis direction of the lens;

arranging an elastic member in the barrel holding part received in the barrel receiving portion of the pedestal mount;

fitting an interposing member onto the pedestal mount and interposing the elastic member between the interposing member and the barrel holding part;

receiving an image pickup device, which receives light outgoing from the lens to convert the same into an electric signal to output the same, in an image pickup device receiving portion of the pedestal mount;

regulating threading of the lens unit in the barrel holding part so that light outgoing from the lens forms an image in a light receiving area of the image pickup device; and injecting an adhesive onto threaded portions of the lens unit and the barrel holding part through a notch formed on the interposing member.

\* \* \* \* \*